(12) United States Patent
Shinkai (10) Patent No.: US 11,025,836 B2
(45) Date of Patent: Jun. 1, 2021

(54) DRIVING ASSISTANCE DEVICE, DRIVING ASSISTANCE METHOD, AND DRIVING ASSISTANCE PROGRAM

(71) Applicant: FUJIFILM Corporation, Tokyo (JP)

(72) Inventor: Yasuhiro Shinkai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 244 days.

(21) Appl. No.: 16/053,820

(22) Filed: Aug. 3, 2018

(65) Prior Publication Data
US 2018/0359429 A1    Dec. 13, 2018

Related U.S. Application Data

(63) Continuation of application No. PCT/JP2017/002963, filed on Jan. 27, 2017.

(30) Foreign Application Priority Data

Feb. 25, 2016 (JP) .............................. JP2016-034394

(51) Int. Cl.
*H04N 5/262* (2006.01)
*G09G 5/36* (2006.01)
(Continued)

(52) U.S. Cl.
CPC ............ *H04N 5/2628* (2013.01); *B60R 1/00* (2013.01); *G02B 27/0093* (2013.01);
(Continued)

(58) Field of Classification Search
CPC ............ G02B 27/017; G02B 2027/014; G02B 2027/0138; G02B 2027/0178;
(Continued)

(56) References Cited

U.S. PATENT DOCUMENTS 8,725,309 B2    5/2014  Kubotani et al.
9,230,501 B1 *  1/2016  Starner .............. G02B 27/0179
(Continued)

FOREIGN PATENT DOCUMENTS

CN    101277432    10/2008
CN    101652802    2/2010
(Continued)

OTHER PUBLICATIONS

"International Search Report (Form PCT/ISA/210)" of PCT/JP2017/002963, dated Apr. 18, 2017, with English translation thereof, pp. 1-5.
(Continued)

*Primary Examiner* — Daniel Chang
(74) *Attorney, Agent, or Firm* — JCIPRNET (57) ABSTRACT

A driving assistance device includes a gaze detection unit that detects a gaze of a driver of a vehicle, an imaging selection unit that selects a first imaging unit corresponding to a direction of the gaze from among a plurality of first imaging units that image the periphery of the vehicle, and a display control unit that processes first captured image data obtained by imaging using the selected first imaging unit on the basis of second captured image data obtained by imaging using a second imaging unit that images the front of eyes of the driver and displays an image based on the first captured image data after the processing on a transmission type display unit fixed at the front of the eyes of the driver of the vehicle.

17 Claims, 5 Drawing Sheets

(51) Int. Cl.
| | |
|---|---|
| G09G 5/02 | (2006.01) |
| G09G 5/00 | (2006.01) |
| G09G 5/10 | (2006.01) |
| G09G 3/00 | (2006.01) |
| G06F 3/147 | (2006.01) |
| H04N 7/18 | (2006.01) |
| H04N 5/232 | (2006.01) |
| G06K 9/00 | (2006.01) |
| G08G 1/16 | (2006.01) |
| G02B 27/00 | (2006.01) |
| G02B 27/01 | (2006.01) |
| B60R 1/00 | (2006.01) |
| G06K 9/46 | (2006.01) |
| H04N 5/64 | (2006.01) |
| G06T 3/00 | (2006.01) |

(52) U.S. Cl.
CPC ..... *G02B 27/0172* (2013.01); *G02B 27/0176* (2013.01); *G02B 27/0179* (2013.01); *G06F 3/147* (2013.01); *G06K 9/00805* (2013.01); *G06K 9/00845* (2013.01); *G06K 9/4604* (2013.01); *G08G 1/166* (2013.01); *G08G 1/167* (2013.01); *G09G 3/002* (2013.01); *G09G 5/00* (2013.01); *G09G 5/02* (2013.01); *G09G 5/10* (2013.01); *G09G 5/36* (2013.01); *H04N 5/23219* (2013.01); *H04N 5/23293* (2013.01); *H04N 7/181* (2013.01); *B60R 2300/20* (2013.01); *B60R 2300/307* (2013.01); *B60R 2300/802* (2013.01); *G02B 2027/014* (2013.01); *G02B 2027/0138* (2013.01); *G02B 2027/0178* (2013.01); *G02B 2027/0187* (2013.01); *G06K 9/0061* (2013.01); *G06T 3/0006* (2013.01); *G09G 2370/16* (2013.01); *G09G 2370/20* (2013.01); *G09G 2380/10* (2013.01); *H04N 5/64* (2013.01)

(58) Field of Classification Search
CPC ........ G02B 2027/0187; G02B 27/0093; G02B 2027/0141; G06T 19/006; G06T 7/70; G06T 2207/20112; G06T 2207/30252; G06T 7/00; G06F 3/013; B60R 1/00; B60R 2300/205; B60R 2300/207; G06K 9/00791; G06K 9/00818; G06K 9/3233; G06K 9/00617; G09G 2340/12; G09G 2380/10; H04N 13/156; B60K 2370/1868; B60K 2370/334; B60K 2370/52
USPC ............. 345/8, 156, 633; 348/135; 382/103
See application file for complete search history.

(56) References Cited

U.S. PATENT DOCUMENTS

| | | | | |
|---|---|---|---|---|
| 9,434,309 | B1* | 9/2016 | Smyth | B60R 1/00 |
| 10,573,074 | B1* | 2/2020 | Bull | G02B 27/0101 |
| 2008/0059175 | A1* | 3/2008 | Miyajima | G10L 15/25 |
| | | | | 704/246 |
| 2011/0254698 | A1* | 10/2011 | Eberl | G02B 27/017 |
| | | | | 340/901 |
| 2012/0242694 | A1 | 9/2012 | Hotta et al. | |
| 2013/0286004 | A1* | 10/2013 | McCulloch | G06T 19/006 |
| | | | | 345/419 |
| 2014/0253722 | A1* | 9/2014 | Smyth | H04N 5/23296 |
| | | | | 348/135 |
| 2014/0336876 | A1* | 11/2014 | Gieseke | G06F 3/012 |
| | | | | 701/36 |
| 2015/0035745 | A1* | 2/2015 | Ou-Yang | G06F 3/017 |
| | | | | 701/36 |
| 2015/0232030 | A1* | 8/2015 | Bongwald | G02B 27/0093 |
| | | | | 348/115 |
| 2015/0294505 | A1* | 10/2015 | Atsmon | G06F 3/04815 |
| | | | | 345/633 |
| 2015/0321606 | A1* | 11/2015 | Vartanian | B60R 1/00 |
| | | | | 348/148 |
| 2016/0154238 | A1* | 6/2016 | Weindorf | G02B 27/0101 |
| | | | | 359/630 |
| 2016/0163108 | A1* | 6/2016 | Kim | G02B 27/017 |
| 2017/0109940 | A1* | 4/2017 | Guo | G02B 27/0172 |
| 2017/0115730 | A1* | 4/2017 | Knebel | G02B 27/017 |
| 2017/0124870 | A1* | 5/2017 | Weber | G08G 1/096783 |
| 2017/0161569 | A1* | 6/2017 | Ren | G08G 1/16 |
| 2017/0287217 | A1* | 10/2017 | Kim | G06K 9/00805 |
| 2019/0019045 | A1* | 1/2019 | Ogura | G02B 27/0101 |
| 2020/0012873 | A1* | 1/2020 | Kim | G02B 27/0101 |
| 2020/0090401 | A1* | 3/2020 | Terrano | G06F 3/013 |
| 2020/0271450 | A1* | 8/2020 | Gorur Sheshagiri | |
| | | | | G02B 27/0101 |
| 2020/0388054 | A1* | 12/2020 | Ara jo | G02B 27/0025 |

FOREIGN PATENT DOCUMENTS

| | | |
|---|---|---|
| CN | 103185963 | 7/2013 |
| CN | 104090366 | 10/2014 |
| EP | 1895510 | 3/2008 |
| JP | H107294842 | 11/1995 |
| JP | H10206787 | 8/1998 |
| JP | H10206789 | 8/1998 |
| JP | 2005284473 | 10/2005 |
| JP | 2006040123 | 2/2006 |
| JP | 2006040123 A * | 2/2006 |
| JP | 2006205930 | 8/2006 |
| JP | 2008143701 | 6/2008 |
| JP | 2008230296 | 10/2008 |
| JP | 2008230296 A * | 10/2008 |
| JP | 2009278234 | 11/2009 |
| JP | 2010058631 | 3/2010 |
| JP | 2012198149 | 10/2012 |

OTHER PUBLICATIONS

"International Preliminary Report on Patentability (Form PCT/IPEA/409) of PCT/JP2017/002963", dated Sep. 26, 2017, with English translation thereof, pp. 1-14.

"Office Action of China Counterpart Application", dated Jul. 2, 2020, with English translation thereof, p. 1-p. 19.

Office Action of China Counterpart Application, with English translation thereof, dated Mar. 2, 2021, pp. 1-19.

* cited by examiner

DRIVING ASSISTANCE DEVICE, DRIVING ASSISTANCE METHOD, AND DRIVING ASSISTANCE PROGRAM

CROSS-REFERENCE TO RELATED APPLICATIONS

This application is a Continuation of PCT International Application No. PCT/JP2017/002963 filed on Jan. 27, 2017, which claims priority under 35 U.S.C § 119(a) to Japanese Patent Application No. 2016-034394 filed on Feb. 25, 2016. Each of the above application(s) is hereby expressly incorporated by reference, in its entirety, into the present application.

BACKGROUND OF THE INVENTION

1. Field of the Invention

The present invention relates to a driving assistance device, a driving assistance method, and a non-transitory computer readable recording medium storing a driving assistance program.

2. Description of the Related Art

As a system that assists in driving in a vehicle such as an automobile, a train, a ship, a heavy machine, an aircraft, or an agricultural machine, a system including a plurality of imaging units mounted to be able to image the periphery of the vehicle, a motion detection unit that detects a motion of a head of a driver, and a transmission type head mount display (HMD) that is mounted on the head of the driver for use has been proposed (see JP2009-278234A and JP1998-206789A (JP-H10-206789A)).

In this system, an image captured by the imaging unit corresponding to a gaze of the driver is displayed on the HMD such that the driver is caused to visually recognize a part that is a blind spot of the driver, thereby assisting in safe driving.

SUMMARY OF THE INVENTION

In the system described in JP2009-278234A, the image captured by the imaging unit is merely superimposed on an image viewed by the driver through the transmission type HMD. Therefore, in a case where a part of the image viewed by the driver is captured by the imaging unit, two images having the same content may be observed, which causes the driver to feel uncomfortable.

Since the system described in JP1998-206789A (JP-H10-206789A) uses a non-transmission type HMD, the driver cannot confirm an actual image through the HMD, which hinders safety.

The present invention has been made in view of the above circumstances, and an object of the present invention to provide a driving assistance device, a driving assistance method, and a non-transitory computer readable recording medium storing a driving assistance program capable of assisting in safe driving without causing a driver to feel uncomfortable.

A driving assistance device of the present invention is a driving assistance device that assists in driving of a vehicle, the driving assistance device comprising: a gaze detection unit that detects a gaze of a driver of the vehicle; an imaging selection unit that selects a first imaging unit corresponding to a direction of the gaze from among a plurality of first imaging units that image the periphery of the vehicle; and a display control unit that processes first captured image data obtained by imaging using the first imaging unit selected by the imaging selection unit on the basis of second captured image data obtained by imaging using a second imaging unit that images the front of the eyes of the driver and displays an image based on the first captured image data after the processing on a transmission type display unit fixed at the front of the eyes of the driver of the vehicle.

A driving assistance method according to the present invention is a driving assistance method of assisting in driving of a vehicle, the driving assistance method comprising: a gaze detection step of detecting a gaze of a driver of the vehicle; an imaging selection step of selecting a first imaging unit corresponding to a direction of the gaze from among a plurality of first imaging units that image the periphery of the vehicle; and a display control step of processing first captured image data obtained by imaging using the first imaging unit selected in the imaging selection step on the basis of second captured image data obtained by imaging using a second imaging unit that is mounted on a head of the driver and images the front of the eyes of the driver and displaying an image based on the first captured image data after the processing on a transmission type display unit that is mounted on the head of the driver and fixed at the front of the eyes of the driver.

A non-transitory computer readable recording medium storing a driving assistance program according to the present invention is a non-transitory computer readable recording medium storing a driving assistance program that assists in driving of a vehicle, the non-transitory computer readable recording medium storing the driving assistance program causing a computer to execute: a gaze detection step of detecting a gaze of a driver of the vehicle; an imaging selection step of selecting a first imaging unit corresponding to a direction of the gaze from among a plurality of first imaging units that image the periphery of the vehicle; and a display control step of processing first captured image data obtained by imaging using the first imaging unit selected in the imaging selection step on the basis of second captured image data obtained by imaging using a second imaging unit that is mounted on a head of the driver and images the front of the eyes of the driver and displaying an image based on the first captured image data after the processing on a transmission type display unit that is mounted on the head of the driver and fixed at the front of the eyes of the driver.

According to the present invention, it is possible to provide a driving assistance device, a driving assistance method, and a non-transitory computer readable recording medium storing a driving assistance program capable of assisting in safe driving without causing a driver to feel uncomfortable.

DESCRIPTION OF THE PREFERRED EMBODIMENTS

Hereinafter, embodiments of the present invention will be described with reference to the drawings.

Figure 1:
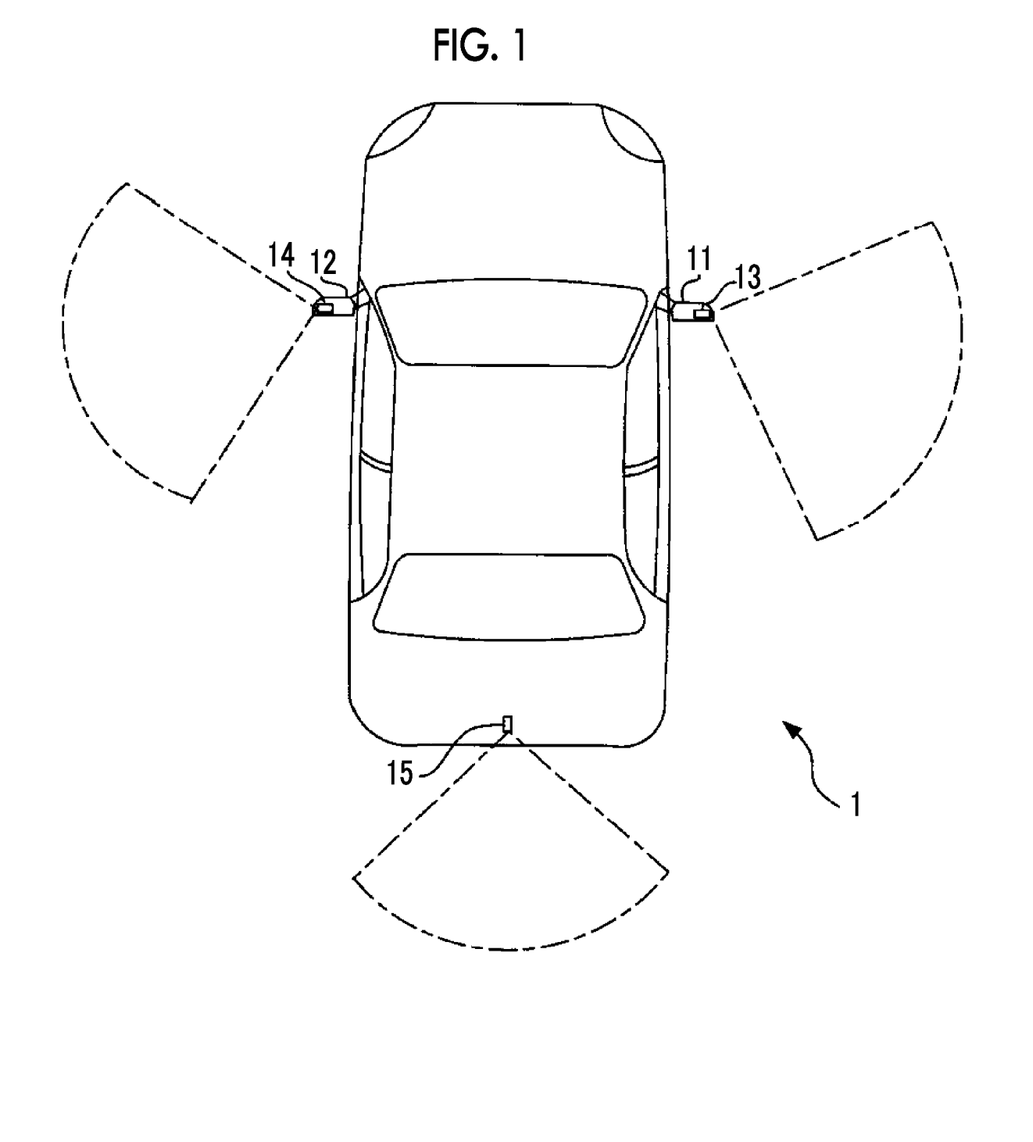
FIG. 1 is a schematic diagram illustrating a schematic configuration of an automobile 1 on which a driver wearing a driving assistance device 2 according to an embodiment of the present invention gets.
Figure 2:
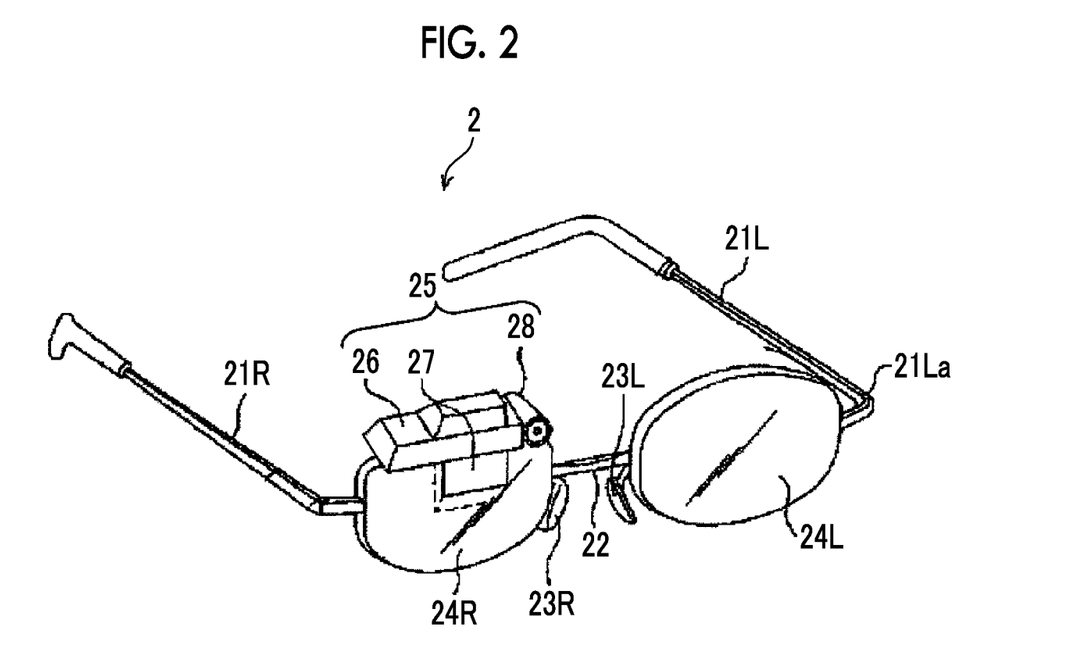
FIG. 2 is a perspective view illustrating an external configuration of the driving assistance device 2 according to the embodiment of the present invention.

FIG. 1 is a schematic diagram illustrating a schematic configuration of an automobile 1 on which a driver on which a driving assistance device 2 according to an embodiment of the present invention is mounted gets. FIG. 2 is a perspective view illustrating an external configuration of the driving assistance device 2 which is an embodiment of the present invention. Here, although an example in which the driving assistance device 2 is mounted on the driver of the automobile 1 will be described, the driving assistance device 2 is mounted on a driver of a vehicle such as a train, a ship, a heavy machine, an aircraft, or an agricultural machine.

In the automobile 1 illustrated in FIG. 1, a right side mirror 11 is provided on the right side of a vehicle body, and a left side mirror 12 is provided on the left side of the vehicle body. The automobile 1 includes a first imaging unit 13 attached to the right side mirror 11, a first imaging unit 14 attached to the left side mirror 12, and a first imaging unit 15 attached to a trunk portion located at the rear side of the automobile 1.

The first imaging unit 13 images a range from the right side of the automobile 1 to the rear side. The first imaging unit 14 images a range from the left side of the automobile 1 to the rear side. The first imaging unit 15 images the rear side of the automobile 1.

Thus, a plurality of first imaging units that image the periphery of the automobile 1 are provided in the automobile 1. The arrangement positions of the first imaging units 13 to 15 are not limited to those illustrated in FIG. 1. For example, the first imaging unit 13 and the first imaging unit 14 may be attached to a fender mirror instead of the right side mirror 11 and the left side mirror 12. Further, the first imaging unit 15 may be installed, for example, at a position in the vicinity of a license plate or at a position in the vicinity of a rear window.

The first imaging units 13 to 15 are connected to the driving assistance device 2 by wires or wirelessly. Captured image data obtained by imaging using the first imaging units 13 to 15 are transferred to the driving assistance device 2 by wires or wirelessly.

The driving assistance device 2 is mounted on a head of the driver and used, and is an eyeglass-shaped device in the example illustrated in FIG. 2. The driving assistance device 2 detects a gaze of the driver on the basis of the captured image obtained by imaging the front of the eyes of the driver in a state in which the driving assistance device 2 is mounted on the head of the driver, and causes the captured image captured by the first imaging unit corresponding to the detected gaze among the first imaging units 13 to 15 to be displayed on the display unit 27. Accordingly, it is possible to visually recognize a range of a blind spot of the driver and assist in safe driving.

The driving assistance device 2 includes an eyeglass body configured of temples 21R and 21L, a bridge 22, nose pads 23R and 23L provided in the bridge 22, and transparent substrates 24R and 24L, and a control unit 25 fixed to the eyeglass body.

The temples 21R and 21L are elongated members made of an elastic material having flexibility or the like and are engaged with the ears or side heads of the driver to perform holding in the head and adjustment of mounting positions.

The bridge 22 is a short bar-like member bridged over predetermined positions of the transparent substrates 24R and 24L face to each other, and holds the transparent substrate 24R and the transparent substrate 24L in a positional relationship via a certain gap.

In the example of FIG. 2, the control unit 25 is fixed to the transparent substrate 24R disposed in front of a right eye of the driver, and includes a housing 26 in which, for example, a battery and a system control unit 30 to be described below are accommodated, the transmission type display unit 27, and a second imaging unit 28.

The display unit 27 is fixed at the front of the eyes of the driver. Accordingly, the driver is able to observe an image in which the image displayed on the display unit 27 overlaps a background image observed from the driver through the display unit 27 and the transparent substrates 24R and 24L.

The second imaging unit 28 images the front of the eyes of the driver. An optical axis and angle of view of the second imaging unit 28 are set to be substantially the same as the gaze and field of view of the driver.

Figure 3:
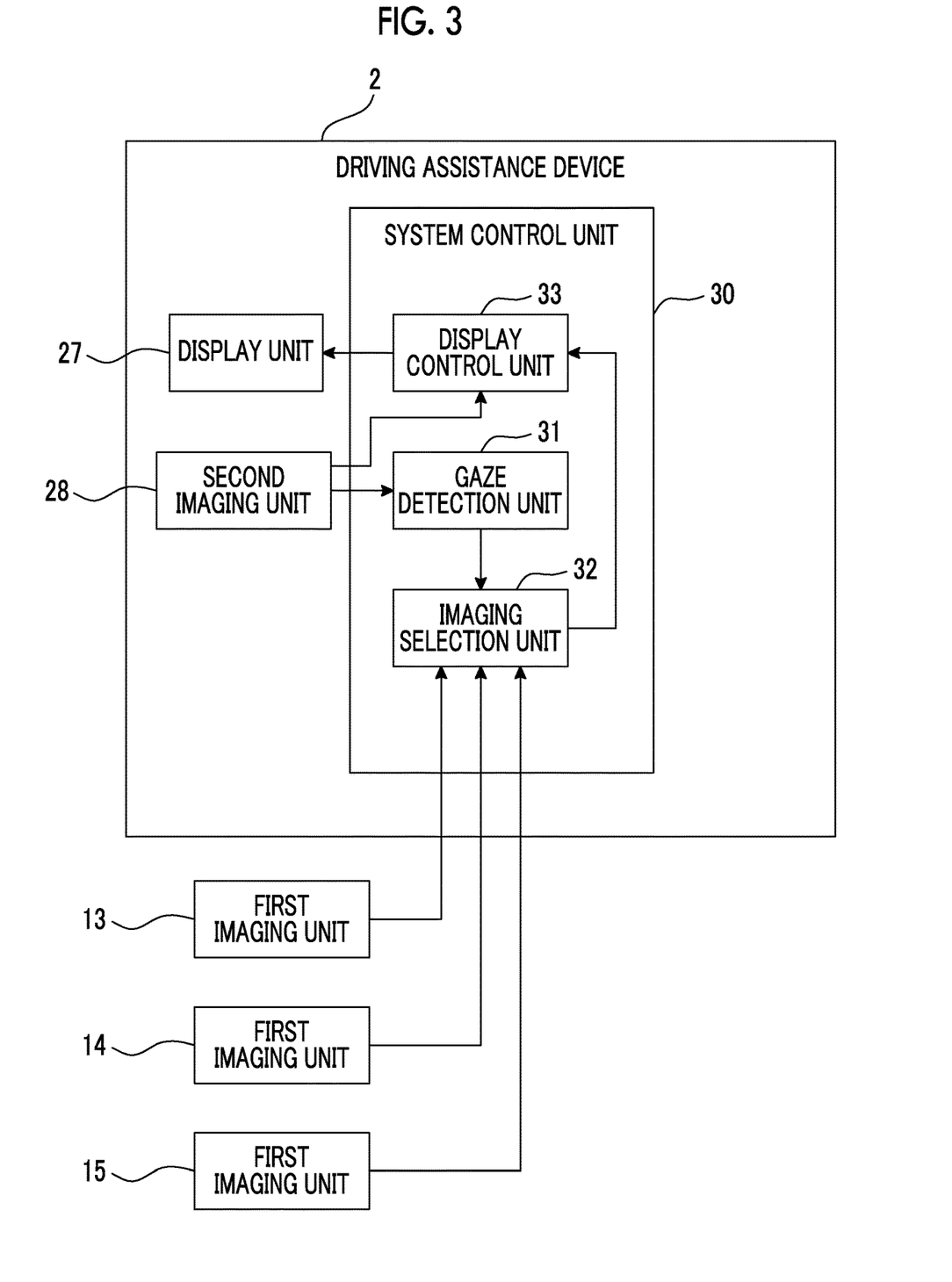
FIG. 3 is a diagram illustrating a block configuration of the driving assistance device 2 illustrated in FIG. 2.

FIG. 3 is a diagram illustrating a block configuration of the driving assistance device 2 illustrated in FIG. 2.

As illustrated in FIG. 3, the driving assistance device 2 includes a display unit 27, a second imaging unit 28, and a system control unit 30.

The system control unit 30 controls the entire driving assistance device 2. The system control unit 30 is mainly configured of a processor, and includes a read only memory (ROM) in which programs to be executed by the processor and the like are stored, a random access memory (RAM) serving as a work memory, and the like.

The system control unit 30 functions as a gaze detection unit 31, an imaging selection unit 32, and a display control unit 33 by the processor executing the program stored in the ROM. This program includes a driving assistance program.

The gaze detection unit 31 acquires second captured image data obtained by imaging the front of the eyes of the driver with the second imaging unit 28 through wired or wireless communication, and analyzes the acquired second captured image data through a known image analysis process to detect the gaze of the driver.

The gaze detection unit 31 may detect a motion of the head of the driver on the basis of information of a sensor such as an acceleration sensor or a gyro sensor provided in the driving assistance device 2, and calculate a gaze of a person on which the driving assistance device is mounted on the basis of the detected motion.

The imaging selection unit 32 selects the first imaging unit corresponding to a direction of the detected gaze from among the first imaging units 13 to 15 on the basis of the gaze of the driver detected by the gaze detection unit 31.

A correspondence relationship between the direction of the gaze of the driver of the automobile 1 and the first imaging unit that can image a landscape in the direction of the gaze of the driver among the first imaging units 13 to 15 is stored as table data in the ROM in advance. The imaging selection unit 32 specifies the first imaging unit corresponding to the direction of the gaze detected by the gaze detection unit 31 from the table data and selects the specified first imaging unit.

Specifically, in a case where it is detected that the gaze of the driver is directed to a right direction with respect to the front, the first imaging unit 13 that images a landscape on the right side relative to a traveling direction in a case where the automobile 1 travels forward is selected. Further, in a case where it is detected that the gaze of the driver is directed to a left direction, the first imaging unit 14 that images a landscape on the left side relative to a traveling direction in a case where the automobile 1 travels forward is selected. Further, in a case where it is detected that the gaze of the driver is directed to a rear side, the first imaging unit 15 that images a landscape in a traveling direction in a case where the automobile 1 travels backward is selected.

The display control unit 33 acquires the first captured image data obtained by imaging using one of the first imaging units 13 to 15 selected by the imaging selection unit 32 and the second captured image data obtained by imaging using the second imaging unit 28. The display control unit 33 processes the first captured image data on the basis of the second captured image data and displays an image based on the first captured image data after the processing on the display unit 27.

This processing is a process of matching an outline of the image observed within the window frame of the automobile 1 by the driver through the display unit 27 and the transparent substrates 24R and 24L with an outline of an image corresponding to such an image (an image obtained by imaging the image) that is obtained by imaging the image using the first imaging unit and displaying the image on the display unit 27. That is, through this processing, the outline of the image matches the outline of the image observed within the window frame of the automobile 1 by the driver through the display unit 27 and the transparent substrates 24R and 24L in a state in which the image based on the first captured image data after the processing is displayed on the display unit 27.

Specifically, the display control unit 33 extracts an outline from a portion (corresponding part) corresponding to the image that is observed within the window frame of the automobile 1 by the driver in the second captured image data through a known outline extraction process. The first imaging unit selected by the imaging selection unit 32 and the second imaging unit 28 are different in position in a front-back direction of the automobile 1 and are also different in a position of an optical axis in a direction of gravity.

Therefore, an outline extracted through an outline extraction process from a portion corresponding to an image observed within the window frame of the automobile 1 by the driver in the second captured image data and an outline of a portion corresponding to this image in the first captured image data obtained by imaging using the first imaging unit selected by the imaging selection unit 32 are different in size and position.

The display control unit 33 performs affine transformation on the first captured image data so that the size and position of the outline of the portion corresponding to this image in the first captured image data are the same as the size and position of the outline extracted through the outline extraction process from the second captured image data.

Next, the processing will be described in detail with reference to FIGS. 4 to 6. Here, the processing to be performed in a case where the driver observes the rear side of the automobile 1 will be described.

Figure 4:
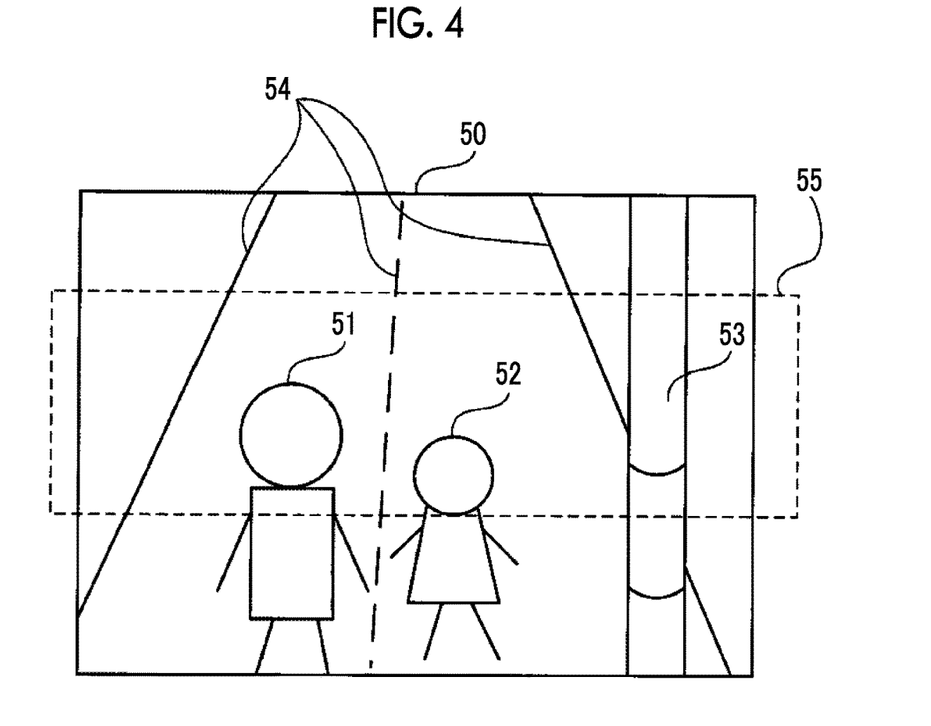
FIG. 4 is a diagram illustrating an example of first captured image data 50 obtained by imaging in a first imaging unit 15.

FIG. 4 is a diagram illustrating an example of the first captured image data 50 obtained by imaging in the first imaging unit 15. The first captured image data 50 illustrated in FIG. 4 includes an image 51 corresponding to a person, an image 52 corresponding to a person, an image 53 corresponding to a utility pole, and an image 54 corresponding to a white line of a road.

Figure 5:
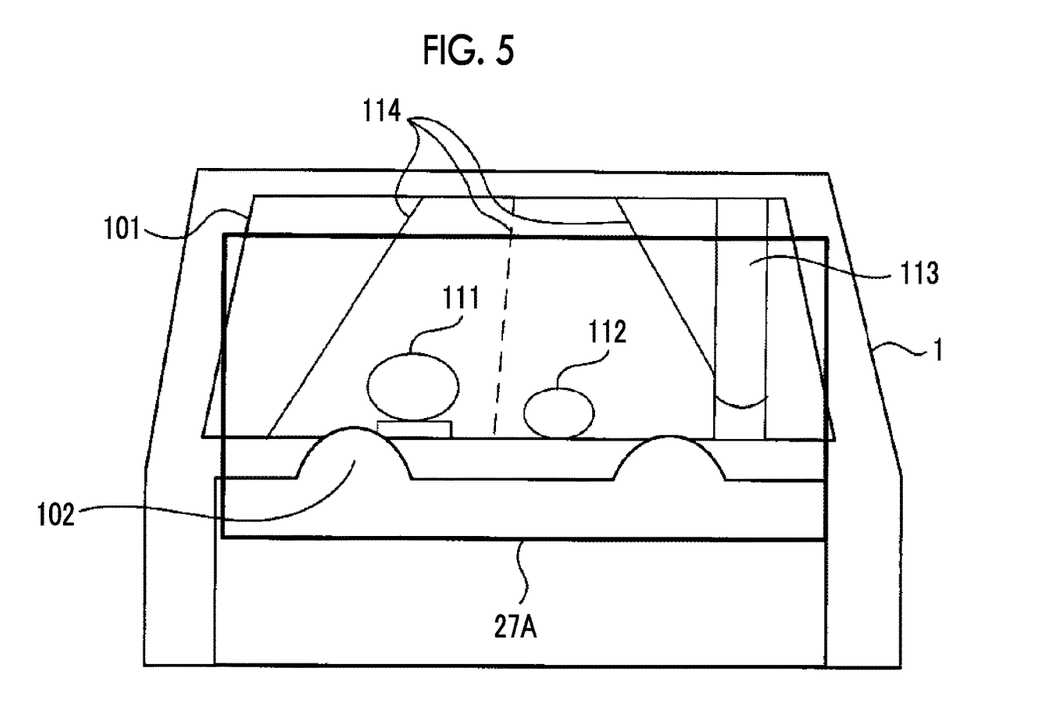
FIG. 5 is a diagram illustrating a landscape inside a vehicle observed from a driver in a case where the driver has the driving assistance device 2 mounted thereon and is directed to a rear side of the automobile 1.

FIG. 5 is a diagram illustrating a landscape inside the vehicle that is observed from the driver in a case where the driver has the driving assistance device 2 mounted thereon and is directed to the rear side of the automobile 1.

A transparent window surrounded by a window frame 101 is provided on the rear side of the automobile 1 such that the driver can observe the rear side of the automobile 1. A seat 102 for passenger seating is provided in the interior of the automobile 1.

Images of a person 111, a person 112, a utility pole 113, a white line 114 of the road, and the like are observed within the window frame 101 through the display unit 27 and the transparent substrates 24R and 24L from the driver having the driving assistance device 2 mounted thereon. In FIG. 5, an image display range 27A of the display unit 27 viewed from the driver having the driving assistance device 2 mounted thereon is shown.

It should be noted that the image 51 illustrated in FIG. 4 is an image obtained by imaging the person 111 using the first imaging unit 15. The image 52 illustrated in FIG. 4 is an image obtained by imaging the person 112 using the first imaging unit 15. The image 53 illustrated in FIG. 4 is an image obtained by imaging the utility pole 113 using the first imaging unit 15. The image 54 illustrated in FIG. 4 is an image obtained by imaging the white line 114 using the first imaging unit 15.

While the driving assistance device 2 is powered on, the gaze detection unit 31 acquires the second captured image data obtained by imaging using the second imaging unit 28 and detects a direction of the gaze of the driver from the acquired second captured image data. In the example of FIG. 5, since it is detected that the driver is directed the rear side of the automobile 1, the imaging selection unit 32 selects the first imaging unit 15.

When the first imaging unit is selected by the imaging selection unit 32, the display control unit 33 acquires the first captured image data 50 captured by the first imaging unit 15 selected by the imaging selection unit 32 and the second captured image data obtained by imaging using the second imaging unit 28.

An image corresponding to the person 111 within the window frame 101, an image corresponding to the person 112 within the window frame 101, an image corresponding to the utility pole 113 of the window frame 101, and an image corresponding to the white line 114 of the window frame 101 are included in the second captured image data.

The display control unit 33 performs a process of detecting the window frame 101 from the second captured image data. Furthermore, the display control unit 33 performs an outline extraction process on the portion of the second captured image data within the window frame 101 to extracts an outline of the image corresponding to the person 111 within the window frame 101, an outline of the image corresponding to the person 112 within the window frame 101, an outline of the image corresponding to the utility pole 113 within the window frame 101, and an outline of the image corresponding to the white line 114 within the window frame 101.

The display control unit 33 also performs an outline extraction process on the first captured image data 50 to extract the outline of each of the images 51 to 54 illustrated in FIG. 4.

The display control unit 33 detects a corresponding range of each of an outline of the image corresponding to the person 111 extracted from the second captured image data, an outline of the image corresponding to the person 112, an outline of the image corresponding to the utility pole 113, and an outline of the image corresponding to the white line 114 in each of the outlines of the images 51 to 54 extracted from the first captured image data. For example, a range 55 illustrated in FIG. 4 is detected as the corresponding range.

The display control unit 33 performs affine transformation on the first captured image data 50 illustrated in FIG. 4 to match the position and size of each of the outlines of the images 51 to 54 detected from the range 55 with each of the outline of the image corresponding to the person 111 extracted from the second captured image data, the outline of the image corresponding to the person 112, the outline of the image corresponding to the utility pole 113, and the outline of the image corresponding to the white line 114.

Figure 6:
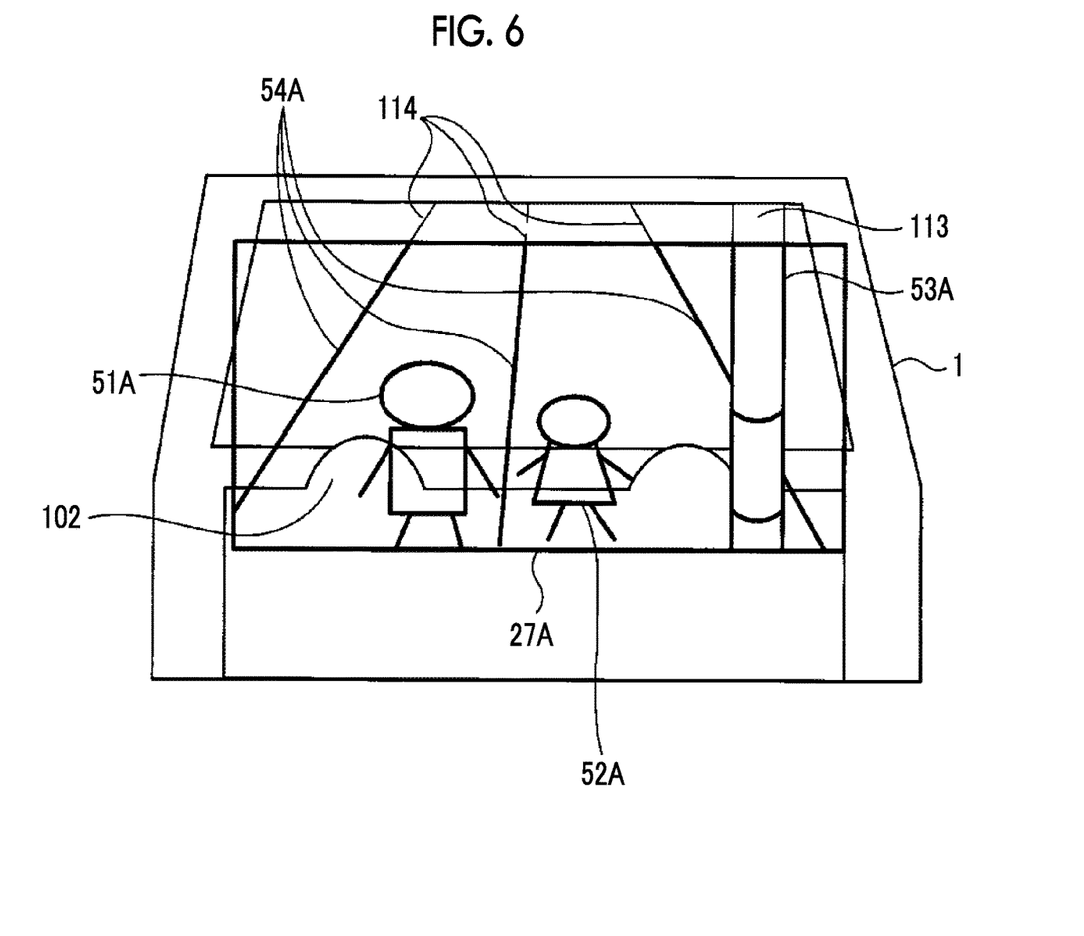
FIG. 6 is a diagram illustrating a landscape observed from a driver in a state in which an image based on the first captured image data 50 after processing is displayed on a display unit 27.

FIG. 6 is a diagram illustrating a landscape that is observed from the driver in a state in which an image based on the first captured image data 50 after the processing is displayed on the display unit 27.

As illustrated in FIG. 6, an outline 51A of the image 51, an outline 52A of the image 52, an outline 53A of the image 53, and an outline 54A of the image 54 in the first captured image data 50 after the affine transformation displayed on the display unit 27 match the outline of the person 111, the outline of the person 112, the outline of the utility pole 113, and the outline of the white line 114 observed within the window frame 101 from the driver, respectively.

Through the above processing, it is possible to assist in safe driving by causing the driver to visually recognize a part of a blind spot of the driver without causing a driver to feel uncomfortable.

Although the display control unit 33 performs the outline extraction process on a part corresponding to the image observed within the window frame 101 by the driver (a part within the window frame detected through the window frame detection process) in the second captured image data, an obstacle detection process of detecting an obstacle that may obstruct the driving of the automobile 1 may be performed on the corresponding part before the outline extraction process and the outline extraction process may be performed on only the part in which the obstacle is detected through the obstacle detection process. By doing so, it is possible to reduce a time required for the outline extraction process and to improve a processing speed.

As a method for the obstacle detection process, for example, a method of detecting a road through white line detection or the like and detecting an object other than a road as an obstacle, a method of detecting an object of which a distance from the automobile 1 is equal to or smaller than a threshold value as an obstacle using an stereo camera or the like, a method of detecting a person detected through a face detection process as an obstacle, a method of detecting an obstacle through image matching with an object pattern (for example, a person, a utility pole, a wall) registered in advance, or the like may be used.

Further, the display control unit 33 may perform the outline extraction process on only a part including a lower end in a direction of gravity in a part of the second captured image data within the window frame 101. It is assumed that there is no obstacle substantially in an upper half of the window frame 101 (an obstacle is far away even though there is the obstacle). Therefore, for example, it is possible to reduce a time required for the outline extraction process and to improve a processing speed by setting a target range of outline extraction process as only a lower half of the window frame 101.

Further, the display control unit 33 may perform the obstacle detection process sequentially from a lower end toward an upper end in the direction of gravity in a part of the second captured image data within the window frame 101 and perform the outline extraction process on only the first detected obstacle in a case where the obstacle is detected through the obstacle detection process.

Since it is assumed that the image observed at a lower end within the window frame 101 is closer to the automobile 1, the obstacle detection process is performed from the lower end toward an upper end on a part of the second captured image data within the window frame 101, the obstacle detection process is ended at a point in time when the obstacle is first detected, and the outline extraction process is performed on only this obstacle. Thus, it is possible to reduce a time required for the obstacle detection process and the outline extraction process, and to improve a processing speed.

Further, the display control unit 33 may perform the obstacle detection process sequentially from a lower end toward an upper end in the direction of gravity in a part of the second captured image data within the window frame 101 and decimate the outline extraction process in a case where the obstacle is not detected from this part.

The decimation process refers to, for example, performing the outline extraction process on every other pixel rows or every plural pixel rows instead of performing the outline extraction process on each pixel row of the image.

A state in which the obstacle is not detected corresponds to, for example, a case where only the image corresponding to the white line 114 is not included in the part of the second captured image data within the window frame 101. Since the white line is a straight line, the decimation of the outline extraction process does not significantly affect accuracy of the outline extraction. By adopting such a configuration, it is possible to reduce a time required for an outline process and improve a processing speed.

Further, in a case where the outline is not extracted as a result of performing the outline extraction process, the display control unit 33 may omit the processing and display an image based on the first captured image data on the display unit 27. Thus, even in a case where the outline is not extracted, it is possible to cause the driver to visually recognize a part that is a blind spot of the driver by displaying a captured image of the outside of the automobile 1 on the display unit 27 as it is.

In addition, it is preferable for the display control unit 33 to control at least one of the color or luminance of the image to be displayed on the display unit 27 on the basis of color of a component (for example, the seat 102 illustrated in FIG. 5) of the automobile 1 observed through the display unit 27 or brightness in the interior of the automobile 1.

For example, the display control unit 33 increases luminance of the image in the case of a backlit situation or in a nighttime when the inside of the vehicle is dark or displays a part overlapping with a component in the image with complementary color of color of a structural part thereof. Thus, it is possible to improve visibility of an image to be displayed on the display unit 27.

The system control unit 30 of the driving assistance device 2 may be provided in a control unit that controls the automobile 1 and may be able to communicate with the display unit 27 and the second imaging unit 28 through wired or wireless communication. By doing so, it is possible to execute a high-load process using a high-performance processor provided in the automobile 1, and to extend a continuous use time of the driving assistance device 2. In this case, the system control unit 30 constitutes the driving assistance device.

As described above, at least the following matters are disclosed in the present specification.

A driving assistance device is a driving assistance device that assists in driving of a vehicle that includes: a gaze detection unit that detects a gaze of a driver of the vehicle; an imaging selection unit that selects a first imaging unit corresponding to a direction of the gaze from among a plurality of first imaging units that image the periphery of the vehicle; and a display control unit that processes first captured image data obtained by imaging using the first imaging unit selected by the imaging selection unit on the basis of second captured image data obtained by imaging using a second imaging unit that images the front of eyes of the driver and displays an image based on the first captured image data after the processing on a transmission type display unit fixed at the front of the eyes of the driver of the vehicle.

The driving assistance device can be mounted on a head of the driver, and can include the transmission type display unit fixed at the front of the eyes of the driver of the vehicle; and the second imaging unit that images the front of the eyes of the driver.

In the driving assistance device, the processing can include processing for matching an outline of an image observed within a window frame of the vehicle by the driver and an outline of an image corresponding to an image included in the image displayed on the display unit.

In the driving assistance device, the display control unit performs an outline extraction process from a corresponding part corresponding to the image observed within the window frame of the vehicle by the driver in the second captured image data, and performs the outline extraction process from the first captured image data, and the processing is processing for matching an outline within a range corresponding to the outline extracted from the second captured image data among the outlines extracted from the first captured image data with the outline extracted from the second captured image data.

In the driving assistance device, the display control unit can perform the outline extraction process on only a corresponding part in the second captured image data, the corresponding part including an obstacle that may obstruct the driving of the vehicle.

In the driving assistance device, the display control unit can perform the outline extraction process on only a part including a lower end of the corresponding part in a direction of gravity in the second captured image data.

In the driving assistance device, the display control unit can perform a process of extracting an obstacle that may obstruct the driving of the vehicle from a lower end toward an upper end of the corresponding part in a direction of gravity in the second captured image data, and perform an outline extraction process on the obstacle detected first from the corresponding part.

In the driving assistance device, the display control unit can perform a process of extracting an obstacle that may obstruct the driving of the vehicle from a lower end toward an upper end of the corresponding part in a direction of gravity in the second captured image data, and decimate the outline extraction process in a case where the obstacle is not detected from corresponding part.

In the driving assistance device, the display control unit can omit the processing and display an image based on the first captured image data on the display unit in a case where the outline is not extracted as a result of performing the outline extraction process performed on the second captured image data.

In the driving assistance device, the display control unit can control at least one of color or luminance of the image to be displayed on the display unit on the basis of color of a component of the vehicle observed through the display unit or brightness in the interior of the vehicle.

In the driving assistance device, the gaze detection unit detects the gaze on the basis of a captured image obtained by imaging the front of the eyes of the driver or detects the gaze on the basis of a motion of the head of the driver.

A driving assistance method is a driving assistance method of assisting in driving of a vehicle, the driving assistance method including: a gaze detection step of detecting a gaze of a driver of the vehicle; an imaging selection step of selecting a first imaging unit corresponding to a direction of the gaze from among a plurality of first imaging units that image the periphery of the vehicle; and a display control step of processing first captured image data obtained by imaging using the first imaging unit selected in the imaging selection step on the basis of second captured image data obtained by imaging using a second imaging unit that is mounted on a head of the driver and images the front of the eyes of the driver and displaying an image based on the first captured image data after the processing on a transmission type display unit that is mounted on the head of the driver and fixed at the front of the eyes of the driver.

In the driving assistance method, the processing can include processing for matching an outline of an image observed within a window frame of the vehicle by the driver and an outline of an image corresponding to an image included in the image displayed on the display unit.

In the driving assistance method, the display control step can include performing an outline extraction process from a corresponding part corresponding to the image observed within the window frame of the vehicle by the driver in the second captured image data, and performing the outline extraction process from the first captured image data, and the processing can include processing for matching an outline within a range corresponding to the outline extracted from the second captured image data among the outlines extracted from the first captured image data with the outline extracted from the second captured image data.

In the driving assistance method, the display control step can include performing the outline extraction process on only a corresponding part in the second captured image data, the corresponding part including an obstacle that may obstruct the driving of the vehicle.

In the driving assistance method, the display control step can include performing the outline extraction process on only a part including a lower end of the corresponding part in a direction of gravity in the second captured image data.

In the driving assistance method, the display control step can include performing a process of extracting an obstacle that may obstruct the driving of the vehicle from a lower end toward an upper end of the corresponding part in a direction of gravity in the second captured image data, and performing an outline extraction process on the obstacle detected first from the corresponding part.

In the driving assistance method, the display control step can include performing a process of extracting an obstacle that may obstruct the driving of the vehicle from a lower end toward an upper end of the corresponding part in a direction of gravity in the second captured image data, and decimating the outline extraction process in a case where the obstacle is not detected from corresponding part.

In the driving assistance method, the display control step can include omitting the processing and displaying of an image based on the first captured image data on the display unit in a case where the outline is not extracted as a result of performing the outline extraction process performed on the second captured image data.

In the driving assistance method, the display control step can include controlling at least one of color or luminance of the image to be displayed on the display unit on the basis of color of a component of the vehicle observed through the display unit or brightness in the interior of the vehicle.

In the driving assistance method, the gaze detection step can include detecting the gaze on the basis of a captured image obtained by imaging the front of the eyes of the driver or detecting the gaze on the basis of a motion of the head of the driver.

A driving assistance program is a driving assistance program of assisting in driving of a vehicle, the driving assistance program causing a computer to execute: a gaze detection step of detecting a gaze of a driver of the vehicle; an imaging selection step of selecting a first imaging unit corresponding to a direction of the gaze from among a plurality of first imaging units that image the periphery of the vehicle; and a display control step of processing first captured image data obtained by imaging using the first imaging unit selected in the imaging selection step on the basis of second captured image data obtained by imaging using a second imaging unit that is mounted on a head of the driver and images the front of the eyes of the driver and displaying an image based on the first captured image data after the processing on a transmission type display unit that is mounted on the head of the driver and fixed at the front of the eyes of the driver.

The present invention is suitable for assistance in driving of an automobile.

EXPLANATION OF REFERENCES

1: automobile
11: right side mirror
12: left side mirror
13 to 15: first imaging unit
2: driving assistance device
21L, 21R: temple
22: bridge
23R, 23L: nose pad
24R, 24L: transparent substrate
25: control unit
26: housing
27A: display unit
28: second imaging unit
30: system control unit
31: gaze detection unit
32: imaging selection unit
33: display control unit
50: first captured image data
51 to 54: images
55: range
101: window frame
102: seat
111, 112: person
113: utility pole
114: white line
27: image display range
51A to 53A: outline

What is claimed is:

1. A driving assistance device that assists in driving of a vehicle and is mounted on a head of a driver of the vehicle, the driving assistance device comprising:

a hardware processor, configured:
to detect a gaze of the driver; and
to select a first camera corresponding to a direction of the gaze from among a plurality of first cameras that image the periphery of the vehicle;

a display, fixed at the front of eyes of the driver of the vehicle; and a second camera that images the front of the eyes of the driver, wherein the hardware processor processes first captured image data obtained by imaging using the first camera selected on the basis of second captured image data obtained by imaging using the second camera and displays an image based on the first captured image data after the processing on the display, the processing is processing for matching an outline of an image observed within a window frame of the vehicle by the driver through the display and a plurality of transparent substrates with an outline of an image corresponding to an image in a state in which the image based on the first captured image data after the processing is displayed on the display, the hardware processor performs an outline extraction process on a corresponding part corresponding to the image observed within the window frame of the vehicle by the driver in the second captured image data, and performs the outline extraction process on the first captured image data, and the processing is processing for matching an outline, among outlines extracted from the first captured image data, with an outline extracted from the second captured image data within a range corresponding to the outline extracted from the second captured image data.

2. The driving assistance device according to claim 1, wherein the hardware processor performs the outline extraction process on only a corresponding pail in the second captured image data, the corresponding part including an obstacle that may obstruct the driving of the vehicle.

3. The driving assistance device according to claim 1, wherein the hardware processor performs the outline extraction process on only a part including a lower end of the corresponding part in a direction of gravity in the second captured image data.

4. The driving assistance device according to claim 1, wherein the hardware processor performs a process of extracting an obstacle that may obstruct the driving of the vehicle from a lower end toward an upper end of the corresponding part in a direction of gravity in the second captured image data, and performs an outline extraction process on the obstacle detected first from the corresponding part.

5. The driving assistance device according to claim 1, wherein the hardware processor performs a process of extracting an obstacle that may obstruct the driving of the vehicle from a lower end toward an upper end of the corresponding part in a direction of gravity in the second captured image data, and decimates the outline extraction process in a case where the obstacle is not detected from the corresponding part.

6. The driving assistance device according to claim 1, wherein the hardware processor omits the processing and displays an image based on the first captured image data on the display in a case where the outline is not extracted as a result of performing the outline extraction process performed on the second captured image data.

7. The driving assistance device according to claim 1, wherein the hardware processor controls at least one of color or luminance of the image to be displayed on the display on the basis of color of a component of the vehicle observed through the display or brightness in the interior of the vehicle.

8. The driving assistance device according to claim 1, wherein the hardware processor detects the gaze on the basis of a captured image obtained by imaging the front of the eyes of the driver or detects the gaze on the basis of a motion of the head of the driver.

9. A driving assistance method of assisting in driving of a vehicle, the driving assistance method comprising:
- a gaze detection step of detecting a gaze of a driver of the vehicle;
- an imaging selection step of selecting a first camera corresponding to a direction of the gaze from among a plurality of first cameras that image the periphery of the vehicle; and
- a display control step of processing first captured image data obtained by imaging using the first camera selected in the imaging selection step on the basis of second captured image data obtained by imaging using a second camera that is mounted on a head of the driver and images the front of the eyes of the driver and displaying an image based on the first captured image data after the processing on a display that is mounted on the head of the driver and fixed at the front of the eyes of the driver,
- wherein the processing is processing for matching an outline of an image observed within a window frame of the vehicle by the driver through the display and a plurality of transparent substrates with an outline of an image corresponding to an image in a state in which the image based on the first captured image data after the processing is displayed on the display,
- wherein the display control step includes performing an outline extraction process on a corresponding part corresponding to the image observed within the window frame of the vehicle by the driver in the second captured image data, and performing the outline extraction process on the first captured image data, and
- the processing is processing for matching an outline, among outlines extracted from the first captured image data, with an outline extracted from the second captured image data within a range corresponding to the outline extracted from the second captured image data.

10. The driving assistance method according to claim 9, wherein the display control step includes performing the outline extraction process on only a corresponding part in the second captured image data, the corresponding part including an obstacle that may obstruct the driving of the vehicle.

11. The driving assistance method according to claim 9, wherein the display control step includes performing the outline extraction process on only a part including a lower end of the corresponding part in a direction of gravity in the second captured image data.

12. The driving assistance method according to claim 9, wherein the display control step includes performing a process of extracting an obstacle that may obstruct the driving of the vehicle from a lower end toward an upper end of the corresponding part in a direction of gravity in the second captured image data, and performing an outline extraction process on the obstacle detected first from the corresponding part.

13. The driving assistance method according to claim 9, wherein the display control step includes performing a process of extracting an obstacle that may obstruct the driving of the vehicle from a lower end toward an upper end of the corresponding part in a direction of gravity in the second captured image data, and decimating the outline extraction process in a case where the obstacle is not detected from corresponding part.

14. The driving assistance method according to claim 9, wherein the display control step includes omitting the processing and displaying of an image based on the first captured image data on the display in a case where the outline is not extracted as a result of performing the outline extraction process performed on the second captured image data.

15. The driving assistance method according to claim 9, wherein the display control step controls at least one of color or luminance of the image to be displayed on the display on the basis of color of a component of the vehicle observed through the display or brightness in the interior of the vehicle.

16. The driving assistance method according to claim 9, wherein the gaze detection step includes detecting the gaze on the basis of a captured image obtained by imaging the front of the eyes of the driver or detecting the gaze on the basis of a motion of the head of the driver.

17. A non-transitory computer readable recording medium storing a driving assistance program that assists in driving of a vehicle, the driving assistance program causing a computer to execute:
- a gaze detection step of detecting a gaze of a driver of the vehicle;
- an imaging selection step of selecting a first camera corresponding to a direction of the gaze from among a plurality of first cameras that image the periphery of the vehicle; and
- a display control step of processing first captured image data obtained by imaging using the first camera selected in the imaging selection step on the basis of second captured image data obtained by imaging using a second camera that is mounted on a head of the driver and images the front of the eyes of the driver and displaying an image based on the first captured image data after the processing on a display that is mounted on the head of the driver and fixed at the front of the eyes of the driver,
- wherein the processing is processing for matching an outline of an image observed within a window frame of the vehicle by the driver through the display and a plurality of transparent substrates with an outline of an image corresponding to an image in a state in which the image based on the first captured image data after the processing is displayed on the display,
- wherein the display control step includes performing an outline extraction process on a corresponding part corresponding to the image observed within the window frame of the vehicle by the driver in the second captured image data, and performing the outline extraction process on the first captured image data, and
- the processing is processing for matching an outline, among outlines extracted from the first captured image data, with an outline extracted from the second captured image data within a range corresponding to the outline extracted from the second captured image data.

* * * * *